Sept. 27, 1932.  R. W. BURNETT  1,879,971
HAND BRAKE MOUNTING FOR RAILWAY CARS
Filed Aug. 23, 1926
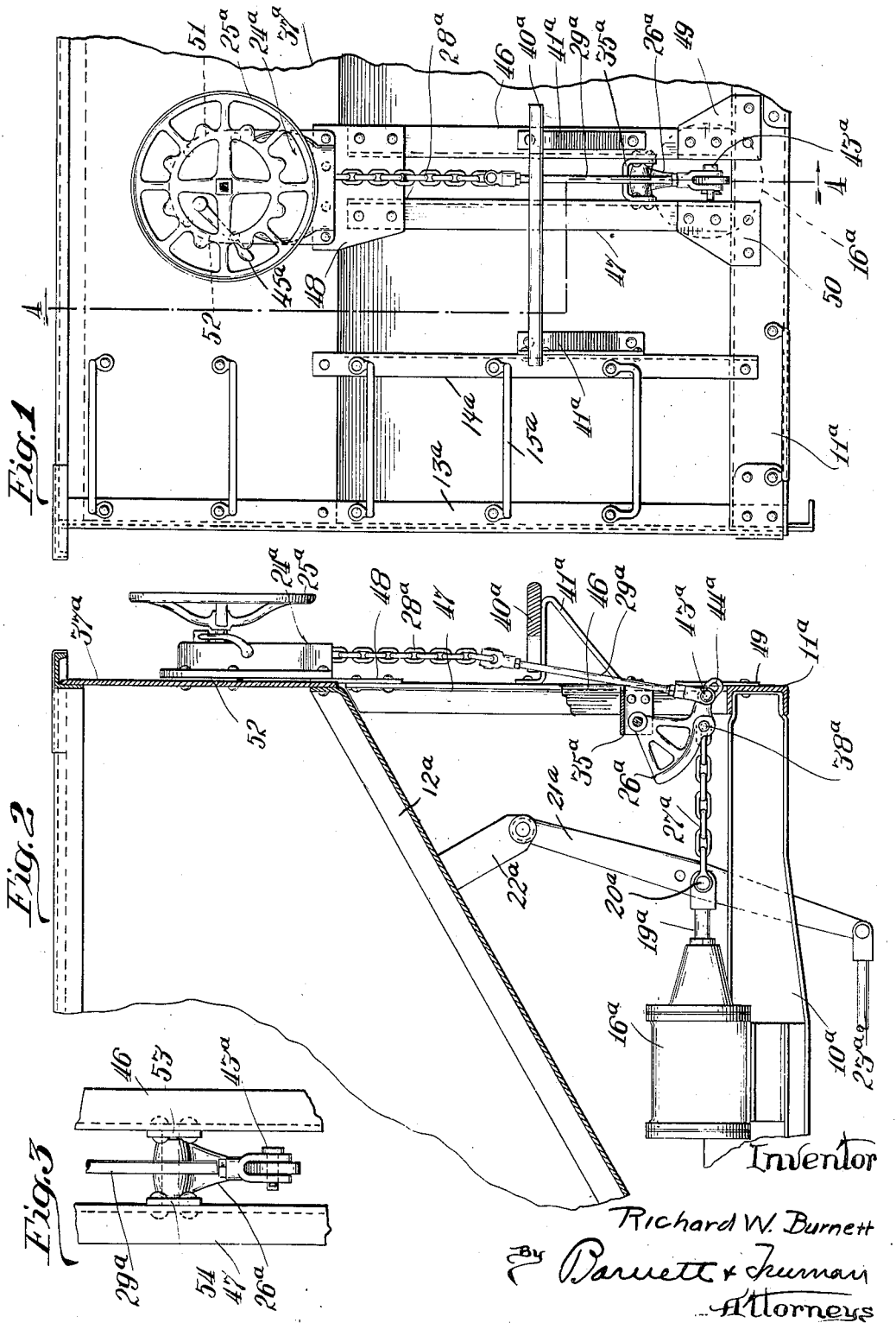
Inventor
Richard W. Burnett
By Barnett & Truman
Attorneys Patented Sept. 27, 1932

1,879,971

UNITED STATES PATENT OFFICE

RICHARD W. BURNETT, OF CHICAGO, ILLINOIS

HAND BRAKE MOUNTING FOR RAILWAY CARS

Application filed August 23, 1926. Serial No. 130,921.

My invention relates to an improved arrangement and means for mounting hand brake mechanism on railway cars, and has for one of its objects the provision of a new and improved arrangement of the hand-brake mechanism whereby the power from said mechanism may be applied to the brake rigging of a car at the same point where the air-brake power is applied.

A more specific object is to provide an improved arrangement and means for conveniently mounting hand brake mechanism to cars, particularly cars of the hopper type or other types of cars in which the air brake cylinder is arranged above the frame of the car or in which the standard hand-brake mechanism is, ordinarily, so connected with multiplying levers as to provide a relatively long travel for the hand-brake connection. The present invention provides, in connection with brake rigging of the above character, an arrangement whereby the travel of the hand brake connection attached to said rigging will be substantially the same as the travel of the air brake cylinder piston of the brake rigging.

A further object of the invention is to provide supporting means for the hand brake mechanism which may be conveniently applied to cars of different constructions and which in addition to supporting parts of the brake operating mechanism, also provides reinforcement for the car structure.

The invention consists in the new and improved arrangement, construction and combination of parts and devices hereinafter more specifically described and claimed for carrying into effect the above stated objects and such other incidental objects that will appear from the description of the several embodiments of the invention shown in the drawing.

In the drawing:

Fig. 1 is a fragmentary end elevation of a railway hopper car provided with improved means for supporting certain parts of the brake operating mechanism.

Fig. 2 is a longitudinal section taken on lines 4—4 of Fig. 1, and

Fig. 3 is a fragmentary view showing a modification.

The arrangement of the hand brake mechanism herein shown and the means for mounting said mechanism on a railway car is particularly suitable for railway cars of the hopper type, in which the air brake cylinder is supported above the framing of the car so as to apply the air pressure to a lever of the brake rigging at a point above the under frame. It will, of course, be understood that the advantages of the invention are not confined to cars of the particular type shown. Obviously the embodiments shown in the drawing may be varied by persons skilled in the art, so that the advantages disclosed can be obtained in connection with cars of various types.

Referring first to the embodiment of the invention shown in Figs. 1 and 2 of the drawing: $10^a$ designates the longitudinal sills of a railway-hopper car, $11^a$ the end sill, $12^a$ the hopper, $13^a$ the corner post, and $14^a$ an end ladder side angle, to which the ladder rungs $15^a$ are attached. The air brake cylinder $16^a$ is supported by suitable means on the car frame. The air cylinder piston rod $19^a$ is connected at $20^a$ with the lever $21^a$ of the brake rigging of the car. The lever $21^a$ is fulcrumed at its upper end to a bracket $22^a$ and is attached at its lower end to a brake rod $23^a$.

The hand brake mechanism of cars of the above type have heretofore been attached to the lower end of the lever $21^a$ so as to have a longer travel than the travel of the air piston rod $19^a$. In the present invention, I provide an arrangement whereby the travel of the hand brake connection will be substantially the same as the normal travel of the air piston rod of the brake rigging.

The hand-brake operating mechanism illustrated herein may be described generally as consisting of a casing $24^a$ in which winding mechanism (not shown) is enclosed, a hand wheel $25^a$ for operating the winding mechanism, a bell crank $26^a$ attached by means of the flexible connector $27^a$ to the brake rigging, and a flexible connector comprising a chain $28^a$ and a rod $29^a$ for connecting the hand power means with the bell crank.

In Figs. 1 and 2 I have shown my preferred means for mounting the hand brake mechanism on the car. In these figures, vertically disposed angle bars 46 and 47 are secured in spaced relation to each other and to the end of the car so as to provide rigidifying end posts. The angle bars may be attached to the car in any suitable or approved manner. In the present embodiment they are preferably riveted or otherwise suitably attached at their upper ends to a gusset 48 and the gusset is secured to the end wall 37a of the car. The lower end of each angle bar is secured to the end sill 11a of the car by means of separate gussets 49 and 50. The casing 24a of the winding mechanism is attached to the end wall or to any other suitable part of the super-structure of the car. Preferably the casing is positioned so that its lower end may be secured to the gusset 48 by some of the rivets used in securing the said gusset to the end wall of the car. Relatively thin spacing members 51 and 52 are interposed between the upper end portion of the casing 24a and the end wall 37a of the car. The bell crank 26a is supported in operative position between the angle bars by means of the inverted U-shaped bracket 35a. The said bracket 35a is secured to the said angle bars in such position that the bell crank chain 27a will be in alignment with the center of the air brake cylinder piston rod 19a and so that the bell crank will pass between the said bars when it is rocked during the brake setting operation.

In many of the hopper car constructions now in general use, the angle bar 46 is included in the standard car construction. In such cases the angle bar 47 is so positioned with relation to the angle bar 46 that the vertical post of the standard construction may be used as one of the supporting posts for the hand brake mechanism.

In Fig. 3 I have shown a modification in which the bell crank 26ª is supported by means of flat plates 53—54 secured to the angle bars 46—47. In this modification the plates 53—54 project beyond the rear face of the angle in substantially the same manner as the bracket 35ª of Fig. 2 projects rearwardly of said angles.

In operation the hand wheel 25ª is rotated in a clockwise direction with reference to Fig. 1 to set the brakes. This operation of the hand wheel rotates the winding mechanism within the casing 24ª so as to wind the chain 28ª thereon. The initial upward rocking of the bellcrank 26ª moves the brake shoes into engagement with the wheels of the car and takes up such slack as may be present in the connections of the brake rigging. With continued upward movement of the bellcrank, the pin 43ª slides outwardly in the slot 44ª of the bellcrank so as to effectively increase the power arm of the bellcrank. When it is desired to release the brakes, the trip lever 45ª is moved from the full line position shown in Fig. 1 to the opposite side of its pivotal axis. While the trip lever is in the last named position, the application of downward pressure on the lever will release the brake winding mechanism so as to relieve the pressure on the brake rigging.

The present application does not include claims on the hand wheel, housing or bellcrank per se or on the combination of the winding mechanism and the bellcrank apart from the means for mounting such combination structure on the car. The above devices and combinations shown herein are claimed in the order mentioned above in my patent and copending application as follows: Patent 1,848,822 dated March 8, 1932; applications Serial Nos. 329,243 filed December 29, 1928; 460,407 filed August 31, 1931; 109,061 filed May 14, 1926 and 349,817 filed March 25, 1929.

I claim:

In combination with the end wall, the end sill, and the brake rigging of a railway car, angle bars secured together and secured to said end wall and end sill, respectively, hand brake mechanism comprising winding means secured to the end structure of the car, a bell crank supported by said angle bars in a position to be rocked in a position between said angle bars, and flexible means connecting the winding means with the bell crank.

RICHARD W. BURNETT.